(12) United States Patent
Vogel et al.

(10) Patent No.: US 9,175,955 B2
(45) Date of Patent: Nov. 3, 2015

(54) METHOD AND SYSTEM FOR MEASURING ANGLES BASED ON 360 DEGREE IMAGES

(71) Applicant: Trimble Navigation Limited, Sunnyvale, CA (US)

(72) Inventors: Michael Vogel, Schleifreisen (DE); Omar Soubra, Westminster, CO (US); Darin Muncy, Thornton, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 134 days.

(21) Appl. No.: 14/067,608

(22) Filed: Oct. 30, 2013

(65) Prior Publication Data

US 2014/0104602 A1 Apr. 17, 2014

Related U.S. Application Data

(62) Division of application No. 13/609,209, filed on Sep. 10, 2012, now Pat. No. 8,600,700, which is a division of application No. 13/177,291, filed on Jul. 6, 2011, now Pat. No. 8,285,512, which is a division of application No. 12/350,871, filed on Jan. 8, 2009, now Pat. No. 7,991,575.

(51) Int. Cl.
*G01B 11/26* (2006.01)
*H04N 7/18* (2006.01)
(Continued)

(52) U.S. Cl.
CPC .............. *G01B 11/26* (2013.01); *G06T 7/0042* (2013.01); *G02B 13/06* (2013.01)

(58) Field of Classification Search
CPC ....... G01B 11/26; G02B 13/06; G06T 7/0042
USPC ......... 702/42, 57, 82, 85, 150, 151, 158, 159, 702/167; 348/36, 37; 359/448
See application file for complete search history.

(56) References Cited

U.S. PATENT DOCUMENTS

| | | |
|---|---|---|
| 5,642,285 A | 6/1997 | Woo et al. |
| 5,821,900 A | 10/1998 | Kishimoto |

(Continued)

FOREIGN PATENT DOCUMENTS

| | | |
|---|---|---|
| DE | 19922321 C2 | 7/2002 |
| EP | 1936323 A2 | 6/2008 |

(Continued)

OTHER PUBLICATIONS

Jain et al., "A two-axis electrothermal scs micromirror for biomedical imaging," 2003 IEEE/LEOS International Conference on Optical MEMS, Aug. 18-21, 2003; pp. 14-15., downloaded from the Internet: <<http://www.ece.cmu.edu/~mems/pubs/pdfs/ieee/optical_mems/0147_jain-2003.pdf>>.

(Continued)

*Primary Examiner* — John H Le
(74) *Attorney, Agent, or Firm* — Kilpatrick Townsend & Stockton LLP

(57) ABSTRACT

A method of measuring an angle includes orienting a measurement device at a reference position characterized by a reference angle. A first panoramic image defined by a predetermined range of elevation angles is acquired where the first panoramic image includes an object. A first bearing of the object in relation to the reference angle is determined and the measurement device is rotated to a measurement position characterized by a measurement angle. A second panoramic image defined by the predetermined range of elevation angles is acquired where the second panoramic image includes the object. A second bearing of the object in relation to the reference angle is determined. The measurement angle is computed as a function of the first bearing and the second bearing.

20 Claims, 16 Drawing Sheets

(51) Int. Cl.
*G06T 7/00* (2006.01)
*G02B 13/06* (2006.01)

(56) References Cited

U.S. PATENT DOCUMENTS

| | | | |
|---|---|---|---|
| 6,147,598 | A | 11/2000 | Murphy et al. |
| 6,282,362 | B1 | 8/2001 | Murphy et al. |
| 7,339,611 | B2 | 3/2008 | Marold et al. |
| 7,354,167 | B2 | 4/2008 | Cho et al. |
| 7,541,974 | B2 | 6/2009 | Scherzinger |
| 7,619,561 | B2 | 11/2009 | Scherzinger |
| 7,697,127 | B2 | 4/2010 | Vogel |
| 7,719,467 | B2 | 5/2010 | Norda et al. |
| 7,991,575 | B2 | 8/2011 | Vogel et al. |
| 8,024,144 | B2 | 9/2011 | Kludas et al. |
| 8,285,512 | B2 | 10/2012 | Vogel et al. |
| 8,600,700 | B2 | 12/2013 | Vogel et al. |
| 2005/0125142 | A1 | 6/2005 | Yamane |
| 2007/0180716 | A1 | 8/2007 | Hertzman |
| 2009/0138233 | A1 | 5/2009 | Kludas et al. |
| 2009/0220144 | A1 | 9/2009 | Mein et al. |
| 2009/0262974 | A1 | 10/2009 | Lithopoulos |
| 2010/0141759 | A1 | 6/2010 | Scherzinger |
| 2010/0142798 | A1 | 6/2010 | Weston et al. |
| 2010/0172546 | A1 | 7/2010 | Sharp |
| 2010/0174507 | A1 | 7/2010 | Vogel et al. |
| 2011/0066375 | A1 | 3/2011 | France et al. |

FOREIGN PATENT DOCUMENTS

| | | |
|---|---|---|
| EP | 1944572 A1 | 7/2008 |
| EP | 2 431 708 A1 | 3/2012 |
| EP | 2 458 405 A1 | 5/2012 |
| EP | 2 573 513 A1 | 3/2013 |
| WO | 2004/027349 A1 | 4/2004 |
| WO | 2007/031248 A2 | 3/2007 |
| WO | 2009/100773 A1 | 8/2009 |
| WO | 2009/100774 A1 | 8/2009 |
| WO | 2009/106141 A1 | 9/2009 |
| WO | 2010/080950 A1 | 7/2010 |

OTHER PUBLICATIONS

Lee et al., "Magnetostrictive micro mirror for an optical switch matrix," Sensors 2007, 7(10), 2174-2182; downloaded from the Internet: <<http://www.mdpi.com/1424-8220/7/10/2174/pdf>>.

Notice of Allowance of Mar. 23, 2011 for U.S. Appl. No. 12/350,871, 8 pages.

Final Office Action of Jan. 11, 2011 for U.S. Appl. No. 12/350,871, 8 pages.

Non-Final Office Action of Aug. 26, 2010 for U.S. Appl. No. 12/350,871, 11 pages.

Notice of Allowance of Jun. 11, 2012 for U.S. Appl. No. 13/177,291, 9 pages.

Non-Final Office Action of Jan. 23, 2012 for U.S. Appl. No. 13/177,291, 12 pages.

Non-Final Office Action of May 8, 2013 for U.S. Appl. No. 13/609,209, 7 pages.

Notice of Allowance of Aug. 2, 2013 for U.S. Appl. No. 13/609,209, 9 pages.

International Search Report and Written Opinion for PCT Application No. PCT/US2013/060202, mailed Dec. 20, 2013, 12 pages.

METHOD AND SYSTEM FOR MEASURING ANGLES BASED ON 360 DEGREE IMAGES

CROSS-REFERENCE TO RELATED APPLICATIONS

This application is a divisional of U.S. application Ser. No. 13/609,209, filed Sep. 10, 2012, which is a divisional of U.S. application Ser. No. 13/177,291, filed Jul. 6, 2011, now U.S. Pat. No. 8,285,512, which is a divisional of U.S. application Ser. No. 12/350,871, filed on Jan. 8, 2009, now U.S. Pat. No. 7,991,575, the entire contents of which are incorporated herein by reference in their entirety for all purposes.

BACKGROUND OF THE INVENTION

The present invention relates generally to methods and systems for measuring angles. Merely by way of example, embodiments of the present invention provide a system for acquiring and processing 360° images to provide high resolution angular measurements for surveying applications. However, the scope of embodiments of the present invention is broader than this particular application and can be applied to other applications utilizing angular measurements.

In some surveying operations, a horizontal angle, a vertical angle, and a distance to a target point are measured from a reference point. The measured data may be used to calculate the location of the target point using triangulation techniques. In many small-scale survey operations, one person is responsible for surveying the work site using one or more surveying tools.

A theodolite is a surveying instrument that is commonly used in determining the position of an object, particularly on inaccessible ground, with respect to a known position. The theodolite typically includes a telescope that is mounted so that it rotates about both vertical and horizontal axes. The theodolite also includes horizontal and vertical circular scales that are used in measuring the angular position of the telescope after it has been aligned to view a target. The horizontal angle (i.e., bearing) and the vertical angle (i.e., elevation) are read from the circular scales and compared with reference positions to determine the bearing and the elevation of the target with respect to the theodolite. These conventional theodolites require action on the part of the surveyor during operation, both for aligning the telescope on the target and for reading the bearing and elevation data from the circular scales.

In some electronic theodolites, angle encoder are utilized to replace the horizontal and vertical scales and automate the determination of the bearing and elevation. Typically, the instrument is zeroed and then as the instrument is rotated to view the target, the angle encoder provides an output including the angle of rotation. These electronic angle encoders are expensive and may not provide sufficient accuracy for particular applications. Thus, there is a need in the art for improved methods and systems for determining angles of targets with respect to a surveying instrument.

SUMMARY OF THE INVENTION

The present invention provides methods and systems for measuring angles. Merely by way of example, embodiments of the present invention provide a system for acquiring and processing 360° images to provide high resolution angular measurements for surveying applications. However, the scope of embodiments of the present invention is broader than this particular application and can be applied to other applications utilizing angular measurements.

According to an embodiment of the present invention, a system for measuring angles is provided. The system includes a housing and an imaging device disposed in the housing. The system also includes a first optical element disposed in the housing. The first optical element is configured to receive light propagating from a first target along a first optical path and direct the light toward the imaging device and receive light propagating from a second target along a second optical path and direct the light toward the imaging device. The system further includes a processor in electrical communication with the imaging device. The processor is configured to receive data from the imaging device, compute a 360° angular map based on the received data, and determine an angular separation between the first target and the second target.

According to another embodiment of the present invention, a surveying apparatus is provided. The surveying apparatus includes a support structure and a reflective surface mechanically coupled to the support structure. The reflective surface is configured to receive panoramic data over a 360° field of view. The surveying apparatus also includes an optical system mechanically coupled to the support structure and optically coupled to the reflective surface. The surveying apparatus further includes an imaging system mechanically coupled to the support structure and optically coupled to the optical system and a processor. The processor is configured to receive data from the imaging system and compute an angular measurement based on the received data.

According to an alternative embodiment of the present invention, a method of measuring an angle is provided. The method includes orienting a measurement device at a reference position characterized by a reference angle and acquiring a first panoramic image defined by a predetermined range of elevation angles. The first panoramic image includes an object. The method also includes determining a first bearing of the object in relation to the reference angle and rotating the measurement device to a measurement position characterized by a measurement angle. The method further includes acquiring a second panoramic image defined by the predetermined range of elevation angles. The second panoramic image includes the object. Moreover, the method includes determining a second bearing of the object in relation to the reference angle and computing the measurement angle as a function of the first bearing and the second bearing.

According to another alternative embodiment of the present invention, a method of determining an orientation of a measurement device is provided. The method includes orienting the measurement device at a first position, acquiring a first panoramic image including a plurality of object points, and determining a location of the measurement device at the first position. The method also includes repositioning the measurement device to a second position, acquiring a second panoramic image including the plurality of object points, and determining a location of the measurement device at the second position. The method further includes identifying the plurality of object points and determining the orientation of the measurement device in the second position.

Numerous benefits are achieved using the present invention over conventional techniques. For example, an embodiment according to the present invention provides an inexpensive angle measurement device with high accuracy. Additionally, embodiments of the present invention utilize relatively low cost light sensor arrays (e.g., charge coupled device (CCD) or CMOS arrays) that are commonly used in electronic camera systems and are widely available. Because embodiments are relatively small, they can be incorporated in small systems. Depending upon the embodiment, one or more of these benefits may exist. These and other benefits have been described throughout the present specification and more particularly below.

DETAILED DESCRIPTION OF SPECIFIC EMBODIMENTS

Figure 1A:
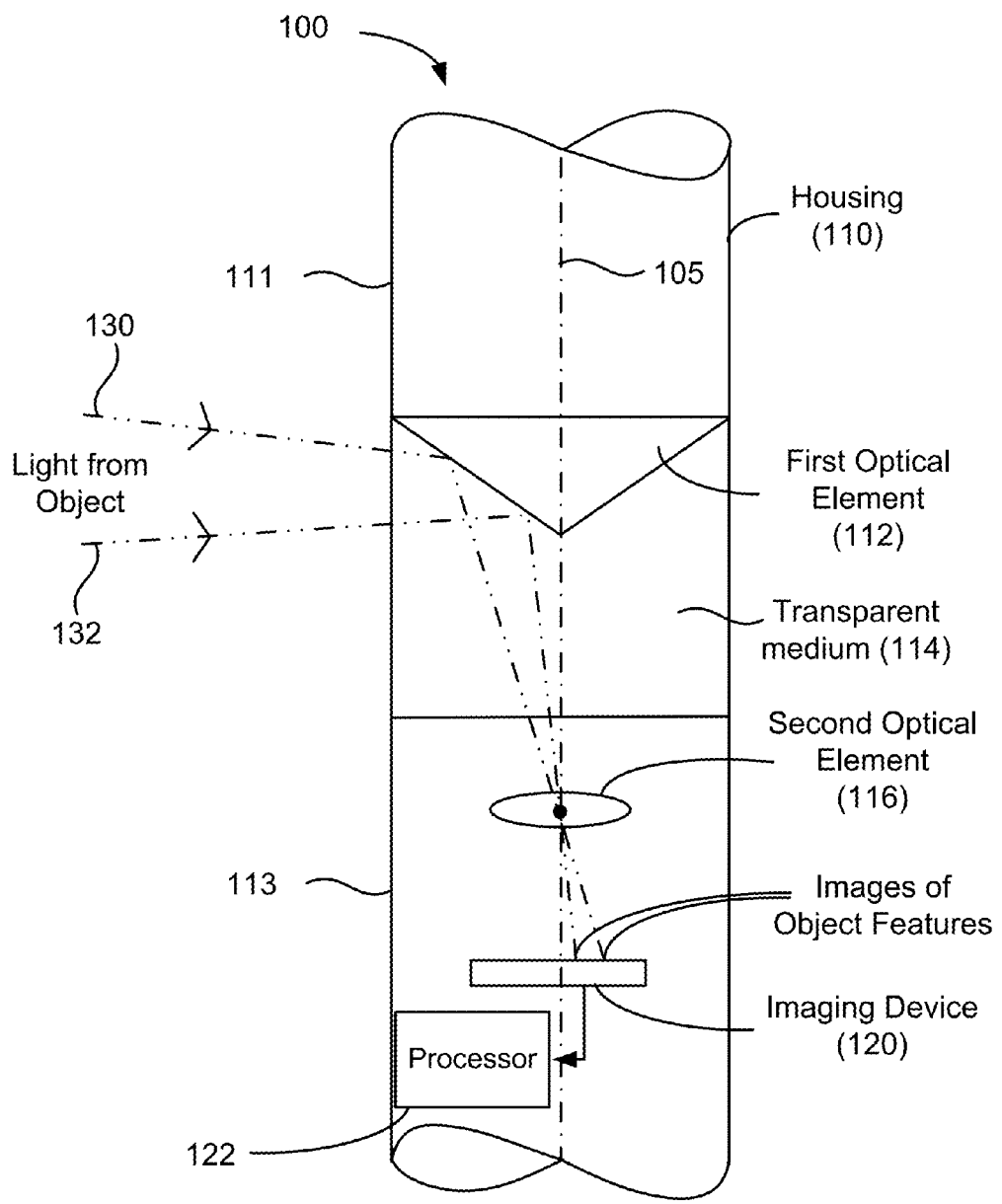
FIG. 1A is a simplified schematic diagram of an angle measurement system according to an embodiment of the present invention.

FIG. 1A is a simplified schematic diagram of an angle measurement system according to an embodiment of the present invention. As illustrated in FIG. 1A, the angle measurement system 100 includes a housing 110 in which one or more of the components of the measurement system are mounted. In a particular embodiment, the housing is a pole, for example, a surveying pole made from a solid material of sufficient strength and rigidity to support the various system components described herein. As an example, the housing may be made from steel, plastic, composite materials, carbon, or the like. A portion of the housing includes a transparent medium or window 114 through which light passes as described more fully throughout the present specification. The transparent medium, which may be made from glass, plastic, or the like, is mounted to the upper portion 111 of the housing and the lower portion 113 of the housing, thereby providing a continuous solid system support extending from the top of the housing (not shown) to the bottom of the housing (not shown). The central portion of the housing 110, passing through the interior of the housing along axis 105, is also optically transparent, for example, hollow, allowing light to pass vertically through portions of the housing.

Light from an external object propagates toward the angle measurement system 100 and passes through the transparent medium 114 as illustrated by the light beams 130 and 132. The light path is modified by the first optical element 112, passes through the central portion of the housing and through some of the lower portion 113 of the housing. As illustrated in FIG. 1A, the light beams pass through a second optical element 116 and an image of the object is formed on imaging device 120. The first optical element 112 is illustrated as a reflective optical element, for example, a mirrored surface, but this is not required by embodiments of the present invention. In other embodiments, the first optical element is a refractive element, a diffractive element, or the like. In a particular embodiment, the first optical element is a reflective cone. In another embodiment, the first optical element is a hyperbolic or parabolic surface with a generally conical shape. Other optical elements that serve to collect incident light from a 360° scene are suitable for use the systems described herein.

The second optical element 116, which is mounted to the housing along the optical path between the first optical element 112 and the imaging device 120, is typically a lens or a set of lenses or one or more mirrors that serve to focus the incoming light on the imaging device 120. One of skill in the art will appreciate that there are a variety of optical lens assemblies suitable for use as the second optical element. As illustrated in FIG. 1A, the second optical element may be a refractive lens(es), but other appropriate optical elements are included within the scope of the present invention. As described more fully throughout the present specification, the optical system illustrated in FIG. 1A will provide for imaging of a cylindrical shell surrounding the angle measurement system 100.

The angle measurement system 100 also includes imaging device 120, which is also positioned along the optical path described above. In the embodiment illustrated in FIG. 1A, the imaging device is substantially perpendicular to the optical path although this is not required by embodiments of the present invention. The imaging device 120 includes a predetermined number of photosensitive elements arranged in an array configuration. In some embodiments, the photosensitive elements may be referred to as photosensitive pixels. For example, the imaging device 120 may be any suitable imaging device, for example, a two-dimensional array of sensor elements capable of generating image information with a number of pixels generally corresponding to the number of elements of the array. The array may be a charge-coupled device (CCD) or a complementary metal-oxide semiconductor (CMOS) image sensor array. Other suitable arrays containing photosensitive elements are also included within the scope of the present invention.

Merely by way of example, an array having 640×480 sensor elements, 4,000×3,000 sensor elements, or other array dimensions is used in an embodiment. A subset of the total number of elements may be used (e.g., an annular ring of photosensitive elements) to generate digital images associated with the cylindrical shell defined by a predetermined range of elevation angles and surrounding the angle measurement device object plane from which light beams 130 and 132 originate. In a particular embodiment, the imaging device 120 is a monochrome OV7640/41 VGA CMOS sensor available from OmniVision of Santa Clara, Calif. The OV7640/41 has a pixel size of 5.6 µm and a built-in analog-to-digital (A/D) converter. In embodiments in which the transparent medium is cylindrical, light from 360° surrounding the housing impinges on the imaging device, with an annular ring of photosensitive elements corresponding to a cylindrical object shell as described more fully below. The extent of the annular ring is a function of the optical system, which provides a predetermined angular collection angle for the first optical element, the second optical element, and other optical system elements. For example, if the range of elevation angles collected by the optical system is ±10°, then for objects at a distance d from the central axis of the housing, the vertical extent of the cylindrical object shell will be)2×d×tan(10°. Thus, utilizing the apparatus illustrated in FIG. 1A, an image from a 360° field of view will be imaged as an annulus on the imaging device. An example of the imaging of a 360° field of view as an annulus is illustrated in more detail in FIGS. 1B and 1C.

As shown in FIG. 1A, the imaging device 120 is coupled to a processor 122 that is capable of exchanging data, for example, data that is acquired by the imaging device, and one or more external entities. For example, light intensity measurement values associated with the photosensitive elements of the imaging device may be transmitted to the processor for angle calculations, as described in relation to FIGS. 2A and 2B. Any type of data transmission is conceivable, such as fixed line or wireless data transmission. In a particular embodiment, fixed line data transmission is utilized for applications in which the processor is mounted in the housing along with the imaging device. The processor 122 may be realized by a hardware arrangement, such as by hard-wired circuits, ASICs (Application Specific Integrated Circuits), software, or any suitable combination of the above. Thus, the processor 122 may be located in the same physical housing as other elements of the device 100 or may be located remotely. One of ordinary skill in the art would recognize many variations, modifications, and alternatives.

It should be noted that although the angle measurement system 100 utilizes the first optical elements as illustrated in FIG. 1A, other optical arrangements including a fisheye lens or a panoramic lens are included within the scope of the present invention. Additionally, non-planar shapes other than conical can be utilized, for example, a hemispherical reflector. One of ordinary skill in the art would recognize many variations, modifications, and alternatives.

Figure 1B:
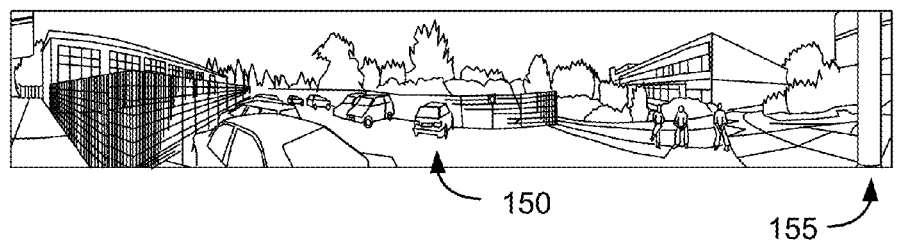
FIG. 1B illustrates a 360° panoramic image according to an embodiment of the present invention.

FIG. 1B illustrates a 360° panoramic field of view according to an embodiment of the present invention. The panoramic field of view, which is captured using the angle measurement device 100 illustrated in FIG. 1A, provides for a complete view of the objects surrounding the angle measurement device for a predetermined range of elevation angles. Objects such as vehicles, fences, buildings, and the like are shown in the illustrated panoramic image.

Figure 1C:
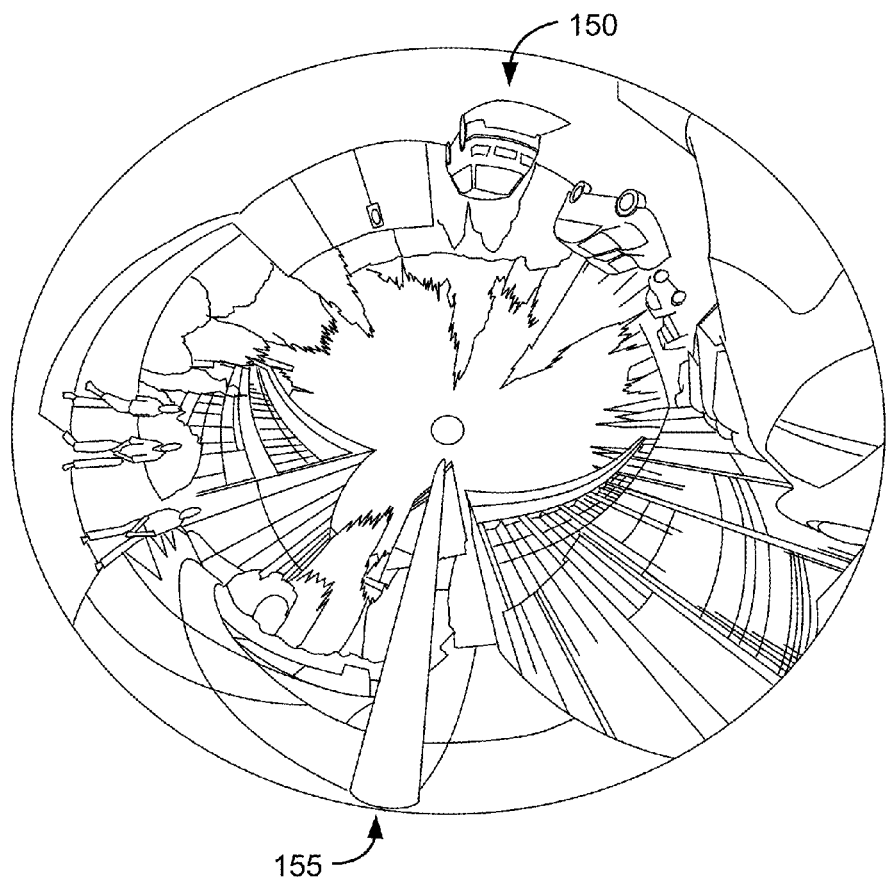
FIG. 1C illustrates mapping of the 360° panoramic image illustrated in FIG. 1B onto an annulus.

FIG. 1C illustrates mapping of the 360° panoramic field of view illustrated in FIG. 1B onto an annulus. The optical elements included in the angle measurement device form an image of the panoramic field of view on the imaging device 120, forming an image of the surroundings in the form of the annular structure shown in FIG. 1C. The 360° degree panorama (i.e., the cylindrical shell) imaged by the angle measurement device is imaged on the annulus in a manner that enables a pitch of the detector elements in the imaging device to be related to the angles between various objects in the field of view. For example, the vehicle 150 located in the center of the field of view shown in FIG. 1A is imaged onto the upper center portion of the imaging device. The pole 155 located on the far right side of the field of view is imaged onto the lower center portion of the imaging device. Thus, the angular separation between these two objects, which is about 180°, results in a placement on the imaging device separated by about 180° of rotation about the center of the annulus. Thus, the known number of pixels positioned on the imaging device at a given distance from the center of the annulus can be related to 360°, providing a transformation between the pixel position in the image and angular separation in the field of view.

As will be evident to one of skill in the art, as the density of the detection elements in the imaging device increases, the angular resolution provided by embodiments of the present invention will increase. Utilizing commercially available high density arrays, angular resolution on the order of less than 0.05 gon can be achieved.

Figure 2A:
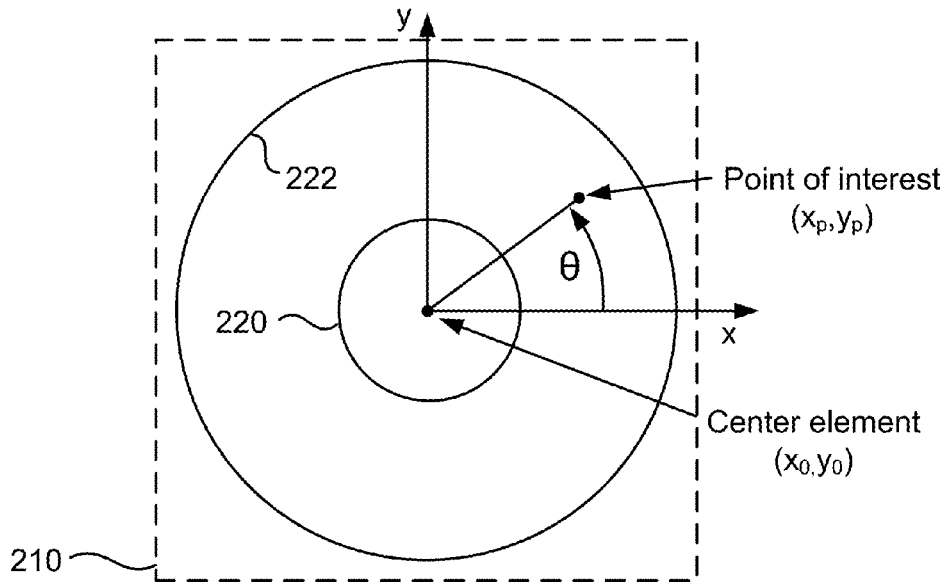
FIGS. 2A and 2B are simplified diagrams illustrating measurement methods according to an embodiment of the present invention.
Figure 2B:
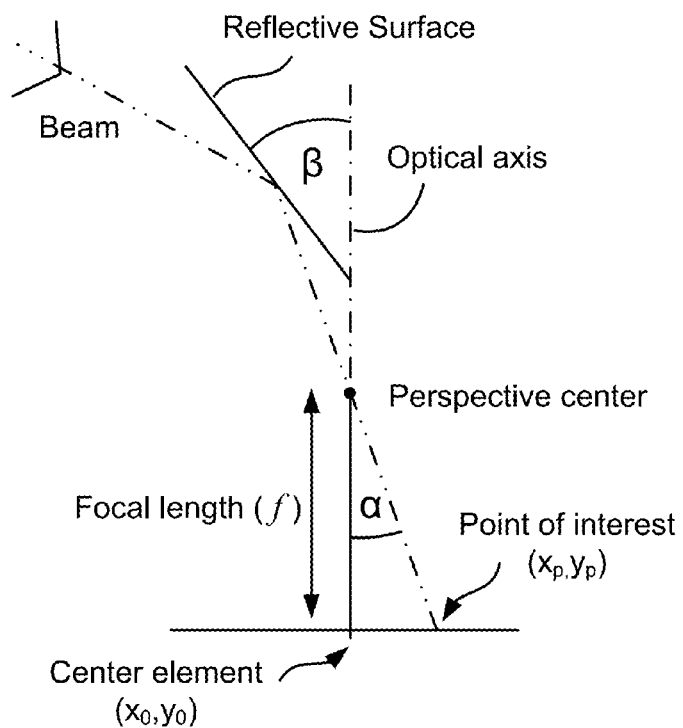

FIGS. 2A and 2B are simplified diagrams illustrating measurement methods according to an embodiment of the present invention. Referring to FIG. 2A, a top view of the annulus on which the cylindrical shell is imaged by the imaging device is illustrated. The cylindrical shell surrounding the angle measurement system, which would be vertical in relation to FIG. 1A, is converted by the first and second optical elements to an annular image lying in the plane of the imaging device, which shown by the dashed square 210 in FIG. 2A. The center element of the imaging device is illustrated as $(x_0, y_0)$. In some embodiments, the center element of the imaging device is located at the actual physical center of the imaging device. However, this is not required by embodiments of the present invention since the "center" element may be defined in terms of the captured image, not the physical geometry of the imaging device.

In this case, the inner boundary 220 of the imaged area defined by the angular collection parameters discussed above, the outer boundary 222 of the imaged area, or combinations thereof, can be used to define the "center" element of the imaging device. Thus, in this case, the center element is defined in terms of the image produced by the optical system, not the particular geometry of the imaging device.

Thus, embodiments compensate for misalignment that may be present in the optical system by defining the center of the sensor array in terms of the position of the image projected onto the imaging device. This "center" element is then used to compute the angles of the various elements in relation to this defined "center" as described below. Thus, embodiments of the present invention, rather than requiring alignment techniques to force the center of the image to correspond to the physical center of the imaging device, define the center of the imaging device in terms of the image projected onto the imaging device. This "center element" may be referred to a calibrated center element.

Whether the center element is defined in terms of the physical center of the imaging device or is a calibrated center element, the point of interest ($x_p$, $y_p$) is defined in relation to the center element. The point of interest, which may be a unique feature present in the surroundings is illustrated at a horizontal angle θ from an arbitrary axis x. In order to compute the horizontal angle θ, the following equation is used:

$$\theta = \arctan\left(\frac{y_p - y_0}{x_p - x_0}\right)$$

Referring to FIG. 2B, the vertical angle α is computed by the following equation:

$$\alpha = \arctan\left(\frac{\sqrt{(x_p - x_0)^2 + (y_p - y_0)^2}}{f}\right),$$

where f is the focal length of the second optical element 116 and β is the angle associated with the first optical element, for example, the angle of the reflective surface with respect to the optical axis.

The elevation (V), which is the vertical angle defined as V=0 gon while aiming at the zenith and V=100 gon while sighting horizontally, is computed using the following equation:

$$V = \alpha + 2 \cdot \beta.$$

The computations described above are applicable to conical sections as illustrated in FIG. 1A. Other coordinate transforms are suitable for use with other surfaces, including hyperbolic surfaces or parabolic surfaces. Thus, embodiments of the present invention will utilize computations of the positions and angles of points of interest employing the appropriate coordinate transforms. One of ordinary skill in the art would recognize many variations, modifications, and alternatives. In some embodiments, a calibration is utilized to estimate parameters including the center point, focal length, distortion, or the like in order to improve the accuracy.

Figure 3A:
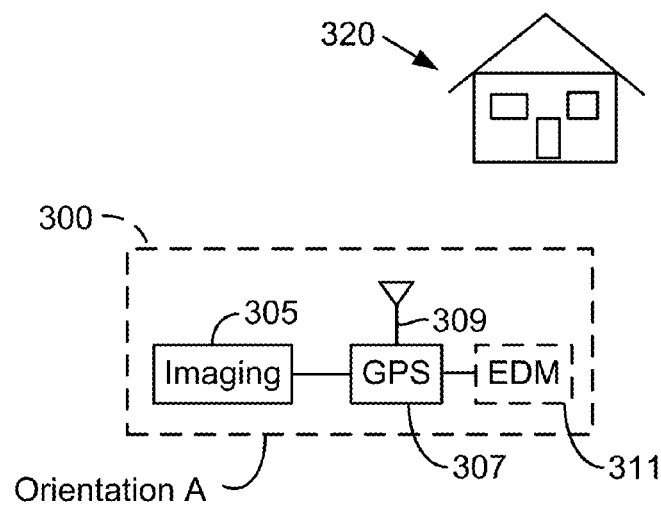
FIGS. 3A and 3B are simplified diagrams illustrating positioning of an angle measurement device during angle measurement operations according to an embodiment of the present invention.
Figure 3B:
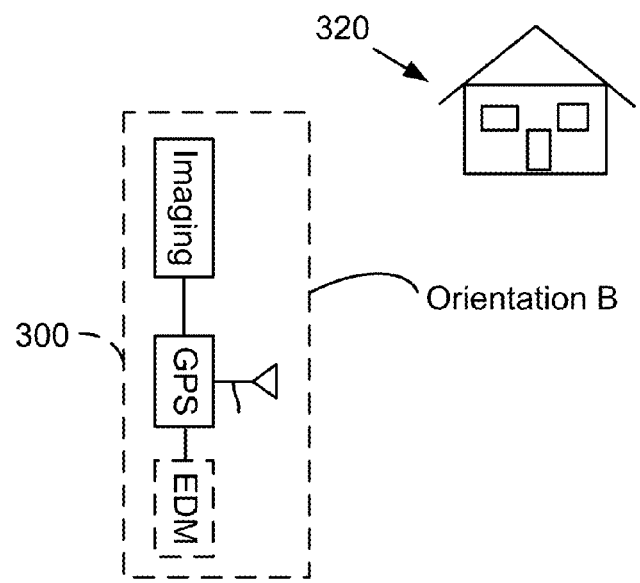

FIGS. 3A and 3B are simplified diagrams illustrating positioning of an angle measurement device during angle measurement operations according to an embodiment of the present invention. An angle measurement system 300 is positioned in a first orientation (Orientation A) characterized by a reference angle. The angle measurement system illustrated in FIGS. 3A and 3B may be similar to the angle measurement system 100 illustrated in FIG. 1A. Alternatively, as described in relation to FIGS. 9A-9D, angle measurement systems may be included as one of the components of a surveying apparatus.

The reference angle can be determined in one of several manners, including setting the reference equal to zero after positioning of the angle measurement system in the first orientation. In the illustrated embodiment, the angle measurement system includes an imaging unit 305, a GPS unit 307, and an antenna 309 coupled to the GPS unit. Other embodiments may include other elements as described in relation to FIG. 1A. The GPS unit 307 may be utilized to determine a location associated with the angle measurement device, although this is not required by the present invention. An optional electronic distance measurement (EDM) unit 311 is also illustrated in FIGS. 3A and 3B. The optional EDM unit, which may include a laser range finder, can be utilized to measure distances from the angle measurement unit to the objects of interest as well as for a pointer to highlight object points for use in determining angles between the object points. Some embodiments utilize a visible laser for this application. Other embodiments utilize an optical/mechanical sighting device as part of the EDM unit or a graphic display of crosshairs or other symbol to show a user the location of the EDM measurement laser. In yet other embodiments, additional hardware such as a tilt sensor for detecting the miss leveling is provided so that the images can be corrected due to miss leveled captured panoramas or an azimuth sensor is provided for delivering a rough azimuth to support, for example, automatic image correlation from images captured from orientation A and orientation B.

Figure 3C:
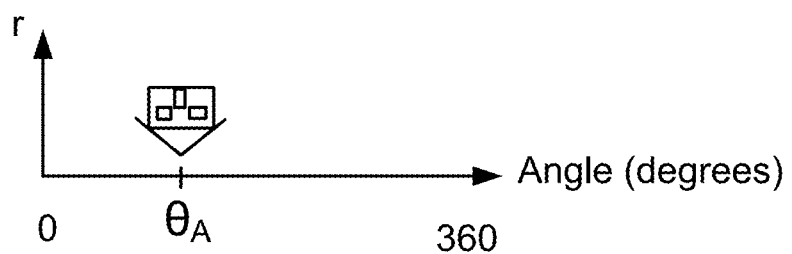
FIGS. 3C and 3D are simplified diagrams illustrating measurement information obtained during angle measurement operations according to an embodiment of the present invention.

In this first orientation, the imaging unit 305 is utilized to capture a first 360° panoramic image of the surroundings, including the object 320. The panoramic image will be characterized by a predetermined range of elevation angles depending on the particular implementation. FIG. 3C is a simplified diagram illustrating measurement information obtained with the angle measurement device positioned in the first orientation. The measurement information includes a bearing angle of the object in relation to the reference angle determined above. Referring to FIG. 3C, the object 320 is positioned at a bearing of $\theta_A°$.

Figure 3D:
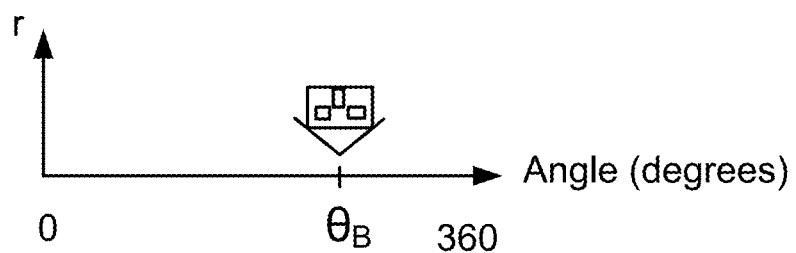

Referring to FIG. 3B, the angle measurement device 100 is rotated to a measurement position. In the illustrated embodiment, the measurement position is rotated about 90° with respect to the reference angle. In this measurement position, a second 360° panoramic image is acquired. The second panoramic image also includes the object 320 and is characterized by a predetermined range of elevation angles. FIG. 3D is a simplified diagram illustrating the measurement information obtained during the acquisition of the second panoramic image. As shown in FIG. 3D, the object is present at a bearing angle of $\theta_B°$ during this second measurement as a result of the rotation of the angle measurement device between measurements. Using the first bearing and the second bearing, the angle of rotation of the measurement device between measurements will be determined as described more fully below.

Figure 3E:
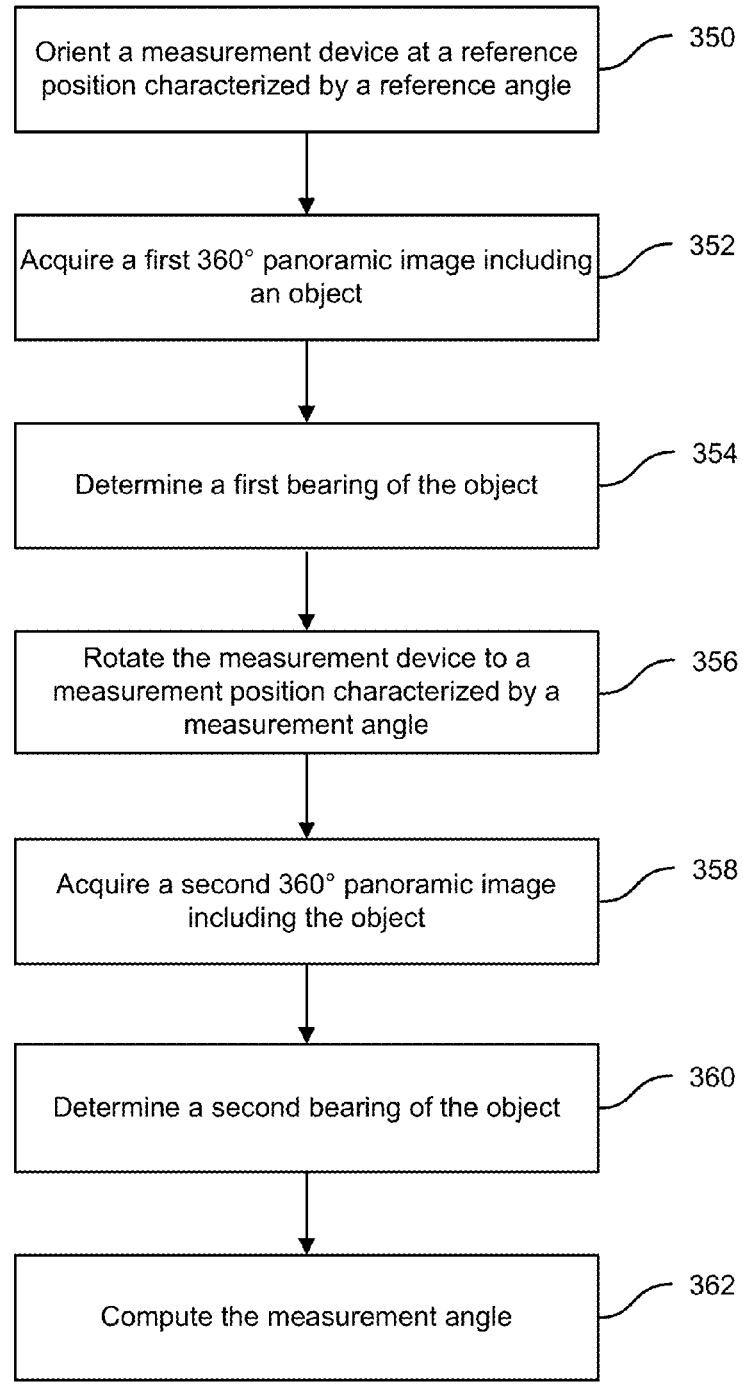
FIG. 3E is a method of measuring an angle according to an embodiment of the present invention.

FIG. 3E is a method of measuring an angle according to an embodiment of the present invention. The method includes orienting a measurement device at a reference position characterized by a reference angle (350). In some embodiments, the position of the measurement device is also determined when the device is in the reference position. A first 360° panoramic image is acquired (352). The first panoramic image is defined by a predetermined range of elevation angles and includes an object or at least one significant structure. Thus, the measurement device is provided with a free view to points of interest in the first orientation. In some embodiments, a distance from the measurement device to the target of interest is determined when the device is in the first orientation at the reference position. In a particular embodiment, the distance to the target of interest, the GPS coordinates of the measurement device, and the panoramic image are obtained concurrently or simultaneously. A first bearing of the object is determined in relation to the reference angle (354). As illustrated in FIG. 3C, the first bearing can be an angle such as $\theta_A°$.

The measurement device is rotated to a measurement position (356). The measurement position is characterized by a measurement angle. The measurement angle in relation to the reference angle will be computed as described below. In some embodiments, the position of the measurement device is determined when the device is in the measurement position. Preferably, the rotation of the device results in little to no lateral movement of the measurement device, however, any deviation in position resulting from the rotation can be utilized in adjusting the measurement result as will be evident to one of skill in the art. A second 360° panoramic image is acquired (358). The second panoramic image includes the object and is also defined by the predetermined range of elevation angles. In some embodiments, a distance from the measurement device to the target of interest is determined when the device is in the second orientation at the measurement position. In a particular embodiment, the distance to the target of interest, the GPS coordinates of the measurement device, and the panoramic image are obtained concurrently or simultaneously. A second bearing of the object in relation to the reference angle is determined (360). As illustrated in FIG. 3D, the bearing may be an angle such as $\theta_B°$.

Utilizing the first bearing and the second bearing, the measurement angle is computed as a function of the first bearing and the second bearing (362). For example, one of several methods including image correlation can be utilized to determine the measurement angle. Thus, identifying at least one significant point in the first and second panoramic images can be utilized in the computation, for instance, by manually or automatically identifying the significant point present in each image. The direction to the target of interest can be normalized to zero degrees and the GPS coordinates of the measurement device and spherical coordinates equations can be utilized to compute the three dimensional coordinates (e.g., in a global system or a local system) of the measurement device. According to embodiments of the present invention, various measurement objects and various kinds of object can be used for bearing measurements. In a particular embodiment, only structures are utilized for bearing measurements. Additionally, it should be noted that the points to be measured don't have to be significant objects or structures. For example, the embodiments described herein can be used for staking out, aligning, or the like.

It should be appreciated that the specific steps illustrated in FIG. 3E provide a particular method of measuring an angle according to an embodiment of the present invention. Other sequences of steps may also be performed according to alternative embodiments. For example, alternative embodiments of the present invention may perform the steps outlined above in a different order. Moreover, the individual steps illustrated in FIG. 3E may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4A:
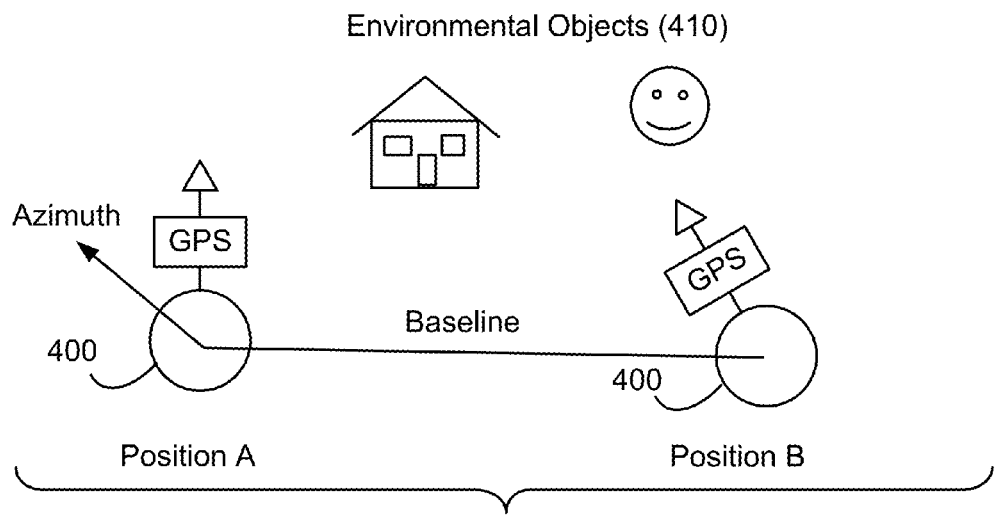
FIGS. 4A-4C are simplified diagrams illustrating a method of determining an orientation of a measurement device according to an embodiment of the present invention.
Figure 4B:
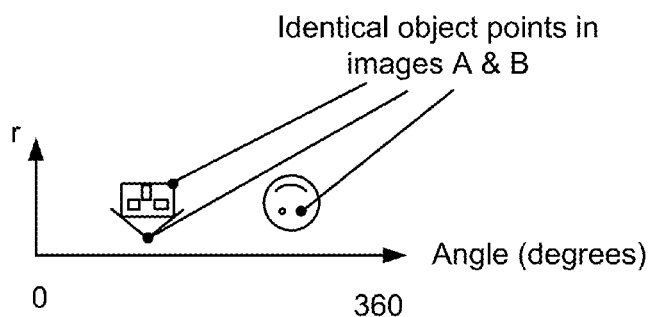
Figure 4C:
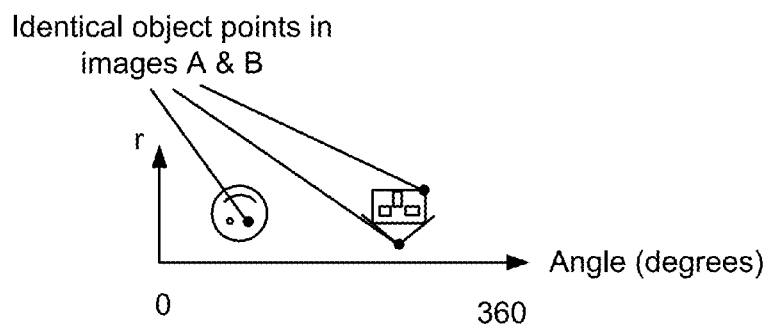

FIGS. 4A-4C are simplified diagrams illustrating a method of determining an orientation of a measurement device according to an embodiment of the present invention. The systems and methods described in relation to FIGS. 4A-4C share some common features and steps with those systems and methods described in relation to FIGS. 3A-E. Referring to FIG. 4A, an angle measurement device 400 is positioned in a first position A so that there is a free view to objects 410, also referred to as points of interest, targets of interest, or the like. At position A, the GPS coordinates of the measurement device are determined and a first 360° panoramic image is captured using the imaging unit of the measurement device. In some embodiments, the GPS coordinates are determined and the first image is captured concurrently or simultaneously. These operations are similar to those performed in relation to the reference position described in relation to FIG. 3A.

FIG. 4A also illustrates the repositioning of the measurement device 400 in a second position referred to as position B. Position B also provides a free view to objects 410. The GPS coordinates of the measurement device are determined at position B and a second 360° panoramic image is captured using the imaging unit of the measurement device. In some embodiments, the GPS coordinates are determined and the second image is captured concurrently or simultaneously. In contrast with similar operations performed in relation to the measurement position described in relation to FIG. 3A, the measurement device has intentionally been moved along the illustrated baseline from position A to position B, thus introducing a displacement and rotation of the measurement device. Thus, the baseline is equal to the distance moved between position A and position B. As illustrated in FIG. 4A, the measurement device 100 is rotated during repositioning from position A to position B.

FIG. 4B is a simplified diagram illustrating measurement information obtained with the angle measurement device positioned in position A. The measurement information includes bearing angles of the environmental objects 410 illustrated in FIG. 4A. The bearing angles of the objects is referenced to a suitable reference angle. Identical object points are illustrated in FIG. 4B for both of the objects in the field of view of the measurement device. Three identical object points are illustrated although fewer or additional object points may be utilized depending on the particular implementation. FIG. 4C is a simplified diagram illustrating measurement information obtained with the angle measurement device positioned in position B. The repositioning of the measurement device to position B (e.g., displacement and rotation) results in the bearing angles for the objects 410 changing from those obtained at position A as illustrated. The identical object points are present in the measurement information associated with position B and will be utilized in determining the orientation of the measurement device as described more fully below.

One of several methods can be utilized to determine the identical object points in the panoramic images represented by FIGS. 4B and 4C. Image correlation techniques may be utilized as well as manual identification of the identical object points. The azimuth is estimated based on photogrammetry and the GPS coordinates measured at positions A and B. In embodiments described herein, system calibration is employed along with either a tilt sensor or other leveling process. Thus, the orientation of the measurement device in position A can be determined based on the photogrammetry technique of relative image orientation using at least two identical object points. For techniques using two identical object points (e.g., at least two points or significant structures), a two axis tilt sensor is used to measure the miss leveling. It should be noted that tilt sensors are suitable for use with the methods and systems described in relation to FIGS. 3A-3B. For techniques using three identical object points, the user of a tilt sensor is optional as will be evident to one of skill in the art.

Figure 4D:
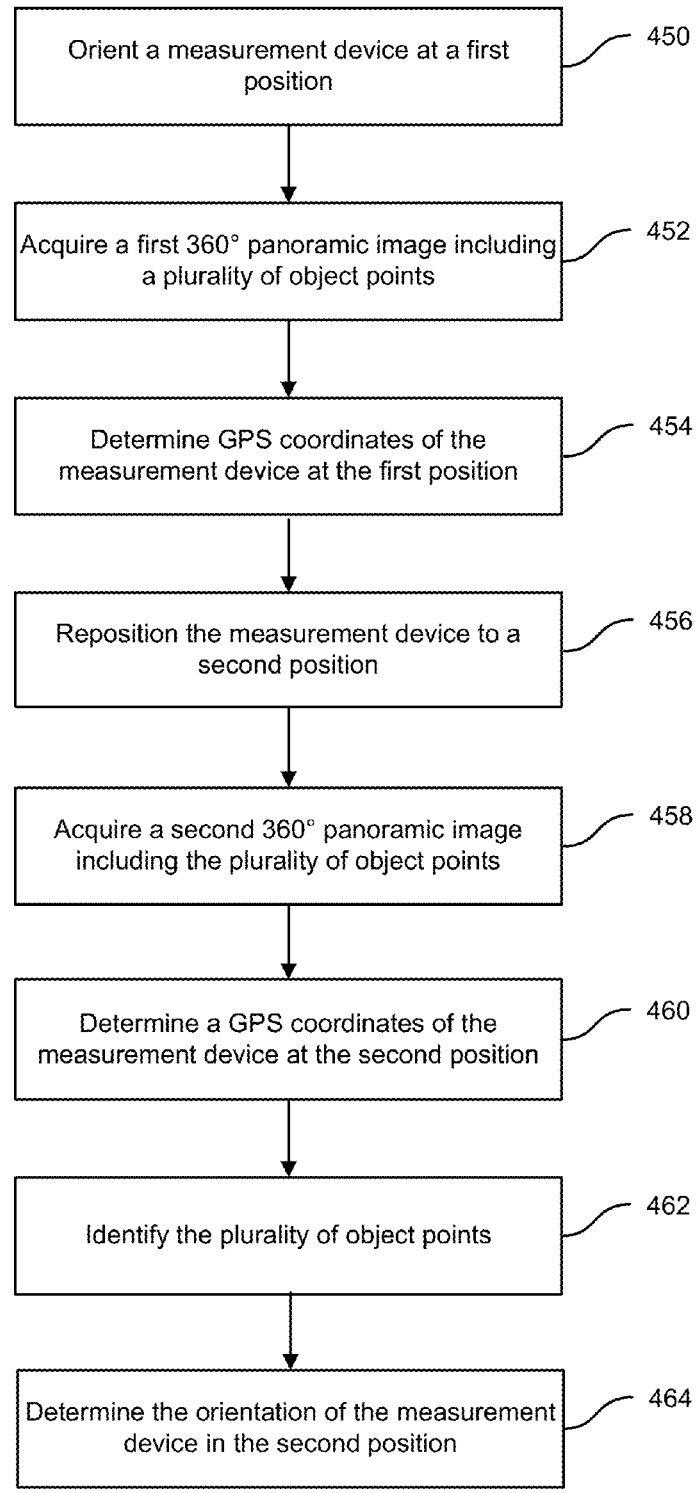
FIG. 4D is a simplified flowchart illustrating a method of measuring an orientation of an angle measurement device according to an embodiment of the present invention.

FIG. 4D is a simplified flowchart illustrating a method of measuring an orientation of an angle measurement device according to an embodiment of the present invention. The method includes orienting a measurement device (e.g., an angle measurement device) at a first position (450). The first position is represented by position A in FIG. 4A. At the first position, a first 360° panoramic image is acquired (452). The panoramic image includes a plurality of object points. The GPS coordinates of the measurement device at the first position are determined (454). Typically, the GPS coordinates are determined concurrently or simultaneously with the acquisition of the first panoramic image. Similar procedures to those described in relation to image acquisition in FIG. 3E may be utilized.

The measurement device is repositioned to a second position (e.g., position B illustrated in FIG. 4A) (456), a second 360° panoramic image is acquired (458) and GPS coordinates of the measurement device at the second position are determined (460). Typically, the GPS coordinates are determined concurrently or simultaneously with the acquisition of the second panoramic image.

The plurality of object points are identified in the first panoramic image and the second panoramic image (462). Although identification of the identical object points is illustrated as a separate process in the flowchart illustrated in FIG. 4D, this is not required by the present invention. The identification of these object points can be performed at a later stage of the process flow as appropriate to the particular implementation. Methods including image correlation or manual object point identification can be utilized as will be evident to one of skill in the art. The orientation of the measurement device in the second position is determined based on the GPS coordinates of the measurement device at the first and second positions and photogrammetry (464). Thus, a method for determining the rotation of the pole at position B with respect to the orientation of the pole at position B is provided.

Having determined the rotation of the pole, it is possible to calculate the real azimuth with the information available from the global GPS coordinates of the measurement device. The azimuth of the measurement device in the first position can be estimated. Using the estimated azimuth, the orientation of the measurement device in the first position and/or the second position can be determined in a global or local coordinate system based on an appropriate coordinate transform. As will be evident to one of skill in the art, the method described herein provides relative orientation (from A and B) based on photogrammetry and the length of the baseline. In order to solve the absolute orientation (i.e., the orientation from common system A and B referring to the global reference system (Azimuth)) the GPS coordinates from position A and B are utilized.

It should be appreciated that the specific steps illustrated in FIG. 4D provide a particular method of determining an orientation of a measurement device according to an embodiment of the present invention. Other sequences of steps may also be performed according to alternative embodiments. For example, alternative embodiments of the present invention may perform the steps outlined above in a different order. Moreover, the individual steps illustrated in FIG. 4D may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
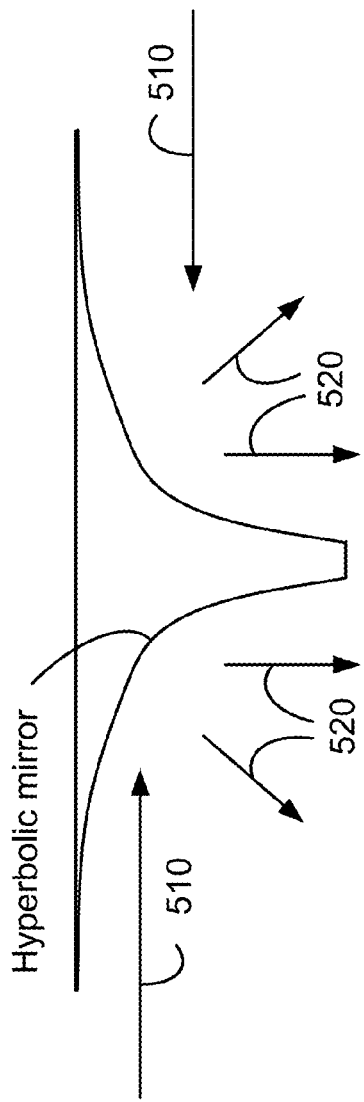
FIG. 5A is a simplified cross-sectional view of a hyperbolic mirror according to an embodiment of the present invention.

FIG. 5A is a simplified cross-sectional view of a hyperbolic mirror according to an embodiment of the present invention. The hyperbolic mirror illustrated in FIG. 5A can be utilized as the first optical element 112 illustrated in FIG. 1. Light from external objects is illustrated by light rays 510. Although light rays 510 are disposed horizontally, a predetermined range of elevation angles will be collected and imaged. Light rays reflected from the hyperbolic mirror are illustrated by light rays 520. The spreading of the rays indicates collection of light over the predetermined range of angles.

Figure 5B:
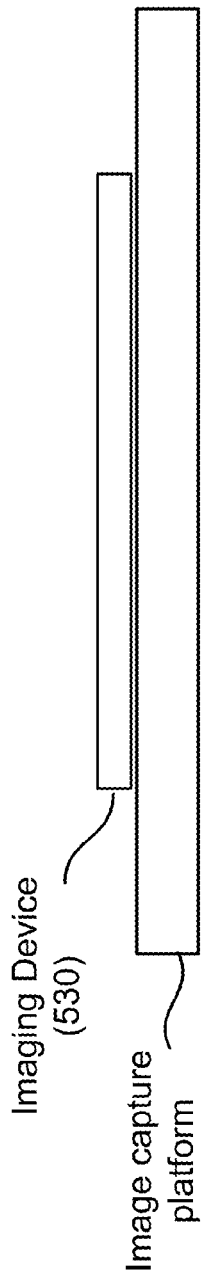
FIG. 5B is a simplified cross-sectional view of a imaging array according to an embodiment of the present invention.

FIG. 5B is a simplified cross-sectional view of a imaging array according to an embodiment of the present invention. The imaging array illustrated in FIG. 5B corresponds to and provides additional description related to the imaging device 120 illustrated in FIG. 1. An image capture platform is provided to provide mechanical support for the single imaging device 530. In the embodiment illustrated in FIGS. 5B and 5C, the image capture platform is rigid and attached to the support structure of the angle measurement device. The image capture platform and the imaging device are illustrated in cross section but will have a depth into the plane of the image in practice. The single imaging device provides for a two dimensional resolution determined by the number of pixels present in the imaging device. Depending on the desired system accuracy, a single imaging device may provide a cost-effective system for angle measurements. Single imaging devices having millions of pixels are currently commercially available, for example, 5 Mpixels, 12 Mpixels (4,000×3,000 elements), 14.7 Mpixels, or 24.6 Mpixels. Embodiments are not limited to these particular imaging devices, but can utilize imaging devices with numbers of elements less than this range, in this range, or greater than this range.

Figure 5C:
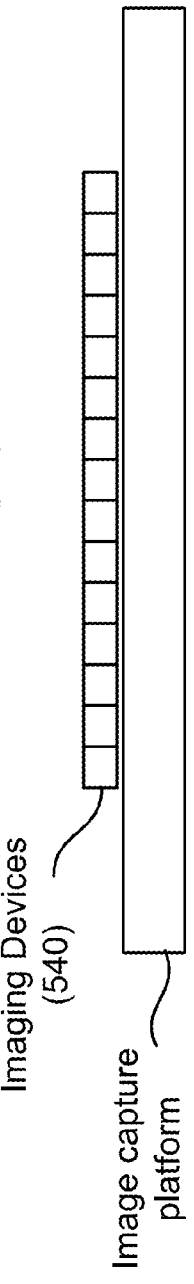
FIG. 5C is a simplified cross-sectional view of an array of imaging arrays according to an embodiment of the present invention.

FIG. 5C is a simplified cross-sectional view of an array of imaging arrays according to an embodiment of the present invention. In order to increase system accuracy, the implementation illustrated in FIG. 5C provides multiple imaging devices 540 supported by the image capture platform. The smaller size of the imaging devices provides for smaller pixel sizes and/or a greater number of total pixels supported by the image capture platform, thereby increasing the number of pixels associated with a panoramic image. As the number of pixels in the panoramic image increase, the angular resolution of the system is increased since the total number of pixels will be disposed within the 360° range of the panoramic image. Thus, since the pixels making up the panoramic image are normalized to 360°, the finer the pixel pitch, the more angular resolution provided by the system. The multiple imaging devices illustrated in FIG. 5C are electrically coupled to provide for readout of the data captured by the various imaging devices.

It should be noted that although a hyperbolic mirror is illustrated in FIG. 5A, this is not required by the present invention. Other surfaces are included within the scope of the embodiments described herein, including parabolic, conic, and the like.

Figure 5D:
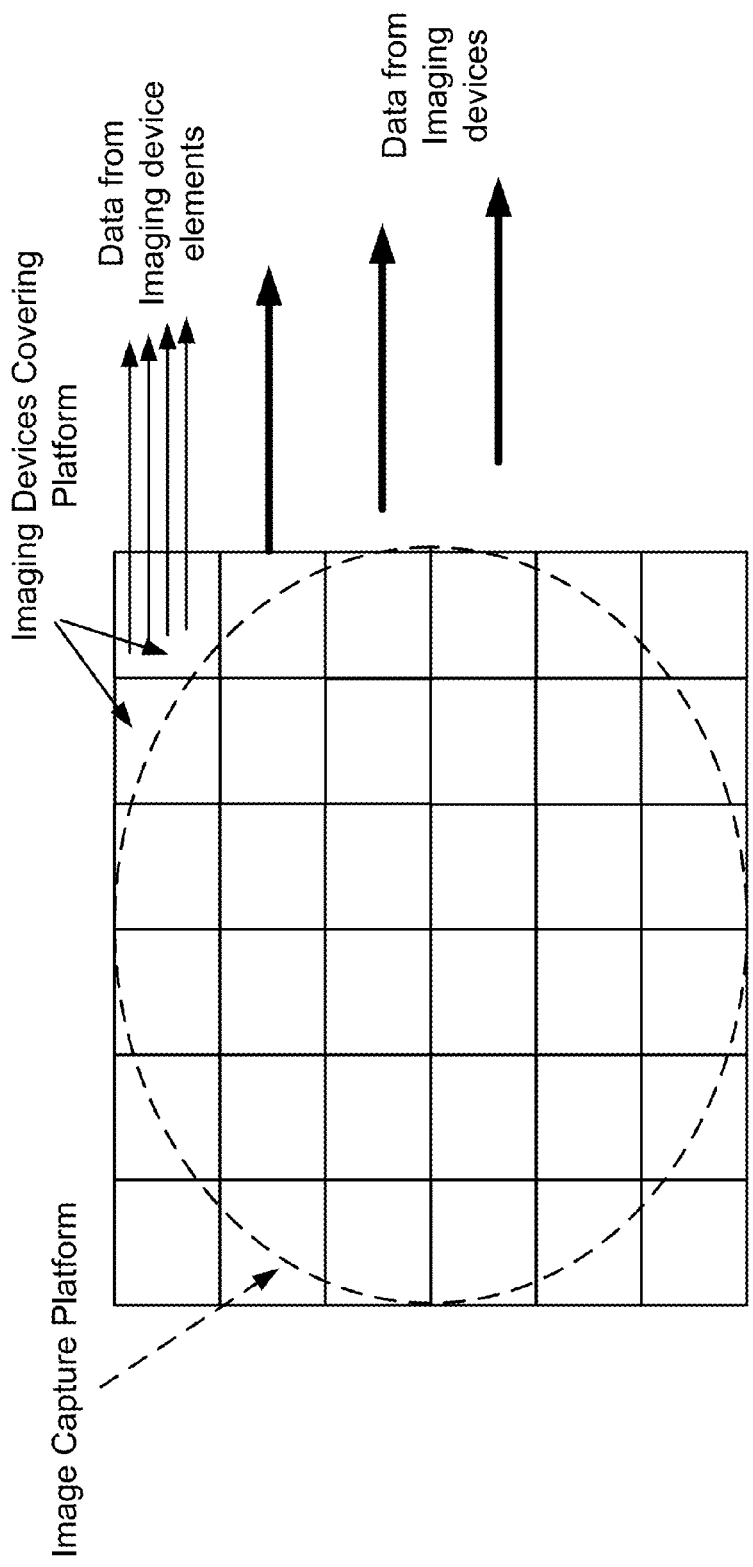
FIG. 5D is a simplified plan view of the array of imaging devices illustrated in FIG. 5C.

FIG. 5D is a simplified plan view of the array of imaging devices illustrated in FIG. 5C. The image capture platform is illustrated as hidden below the array of imaging devices. The shape of the image capture platform, illustrated as generally circular in this figure, will be selected depending on the particular application and the mechanical design criteria associated with the particular application. The multiple imaging devices 540 are arrayed over the surface of the image capture platform. As shown in FIG. 5D, data from the imaging device elements (pixels) is transmitted to a processor, which is typically separate from the imaging devices themselves. Aggregating the data from the imaging device elements provides for data flow from the imaging devices as illustrated. The number and placement of the multiple imaging devices is illustrated as a fully filled two dimensional array in this embodiment, but this is not required by the present invention. Since a panoramic image associated with a cylindrical shell is acquired using the multiple imaging devices, the center portion of the array, as well as the corner portions are typically not utilized in acquiring the panoramic image. Thus, in some implementations, imaging devices at these portions of the array are removed in order to decrease system cost and complexity. Moreover, another implementation may include a fully filled array yet only retrieve data from a predetermined subset of the imaging device elements. One of ordinary skill in the art would recognize many variations, modifications, and alternatives.

Figure 6:
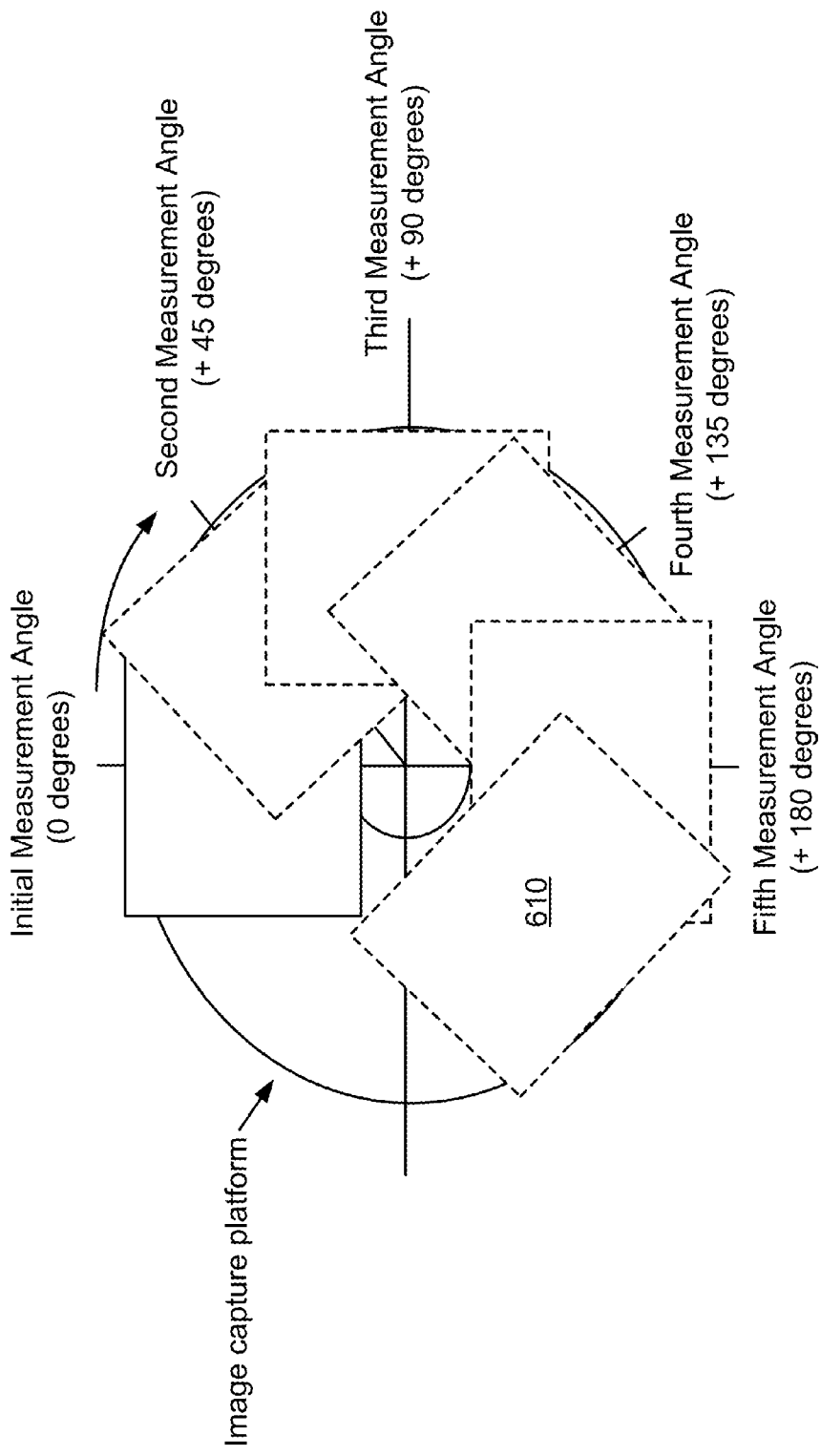
FIG. 6 is a simplified plan view of a method of performing image capture according to an embodiment of the present invention.

FIG. 6 is a simplified plan view of a method of performing image capture according to an embodiment of the present invention. An initial measurement angle is established as illustrated at zero degrees. A single imaging device 610 is utilized to capture a first sub-image associated with the initial measurement angle. Although a single imaging device 610 is illustrated, other embodiments utilize an array of multiple imaging devices to provide for higher pixel count or higher pixel density. Data associated with the first sub-image is transferred to a processor. The imaging device 610 is then rotated to a second measurement angle (e.g., +45 degrees). A second sub-image is captured at the second measurement angle. Data associated with the second sub-image is transferred to a processor. As illustrated in FIG. 6, the process of rotating the imaging device, capturing another sub-image, and transferring the image data is repeated at additional measurement angles, such as the third measurement angle (e.g., +90 degrees), the fourth measurement angle (e.g., +135 degrees), the fifth measurement angle (e.g., +180 degrees), and the like until all 360 degrees are imaged. Based on the multiple sub-images, a 360° panoramic image is formed.

Although the embodiment illustrated in FIG. 6 utilizes rotation of the imaging device 610 on a fixed image capture platform, this is not required by the present invention. The image capture platform may also be rotated in order to place the imaging device in a proper orientation for collection of the sub-images. Additionally, although data transfer from the imaging device to a processor is illustrated after each image acquisition, this is also not required by the present invention since data associated with multiple images may be transferred concurrently. Depending on the memory associated with the imaging device, combinations of these processes may be utilized.

The sub-images collected at the various measurement angles will, to some extent, overlap with adjacent sub-images. The data associated with the overlap regions can be utilized in matching adjacent sub-images or discarded as appropriate to the particular application. Additionally, the amount of camera rotation can be utilized for image stitching. One of ordinary skill in the art would recognize many variations, modifications, and alternatives.

Figure 7A:
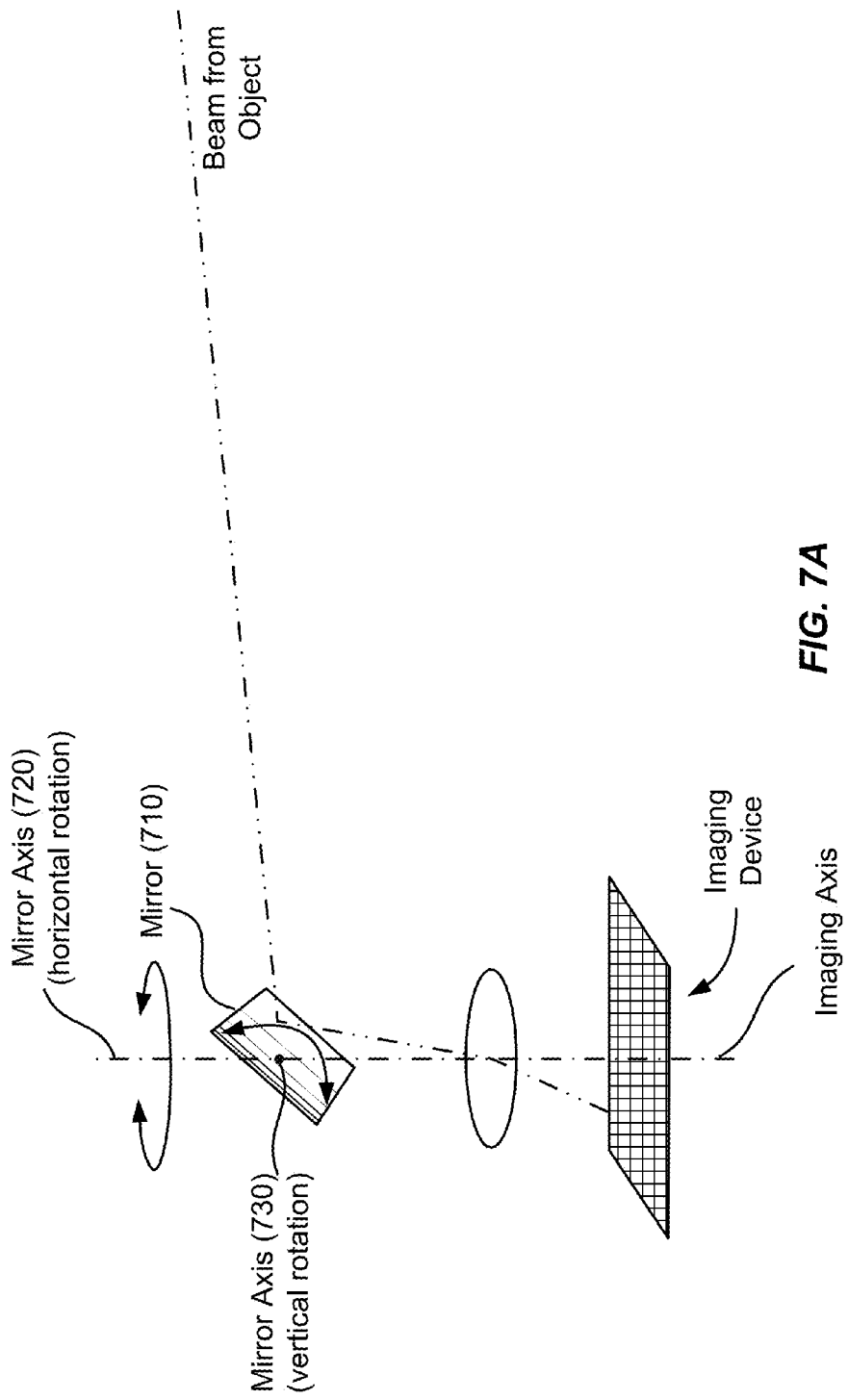
FIG. 7A is a simplified schematic diagram of an angle measurement system according to another embodiment of the present invention.

FIG. 7A is a simplified schematic diagram of an angle measurement system according to another embodiment of the present invention. A light beam from an object is incident on the mirror 710. Additionally, light from a predetermined range of elevation angles is imaged onto the imaging device. Thus, a first strip of the 360° panoramic image is imagined onto the imaging device. In order to collect light from additional portions of the 360° surroundings, the mirror 710 is rotated in the horizontal plane about the mirror axis 720. Thus, by rotating the mirror horizontally about axis 720, light from the illustrated direction, along with light from all 360° of the surroundings is imaged onto the imaging device. As a result, a panoramic image is provided for a first predetermined range of elevation angles associated with the mirror tilt about mirror axis 730.

In order to image objects present in other elevation angle ranges, the mirror can be tilting about mirror axis 730, providing for vertical rotation of the mirror as illustrated. In an embodiment, the mirror is tilted about mirror axis 730 to image a first range of elevation angles and a panoramic image is collected by rotating the mirror about mirror axis 720. The mirror is then tilted to a second angle about mirror axis 730 to image a second range of elevation angles and a second panoramic image is collected by rotating the mirror about mirror axis 720. Thus, by tilting the mirror, a wide range of elevation angles are used in creating a panoramic image that extends toward the north and south poles.

Figure 7B:
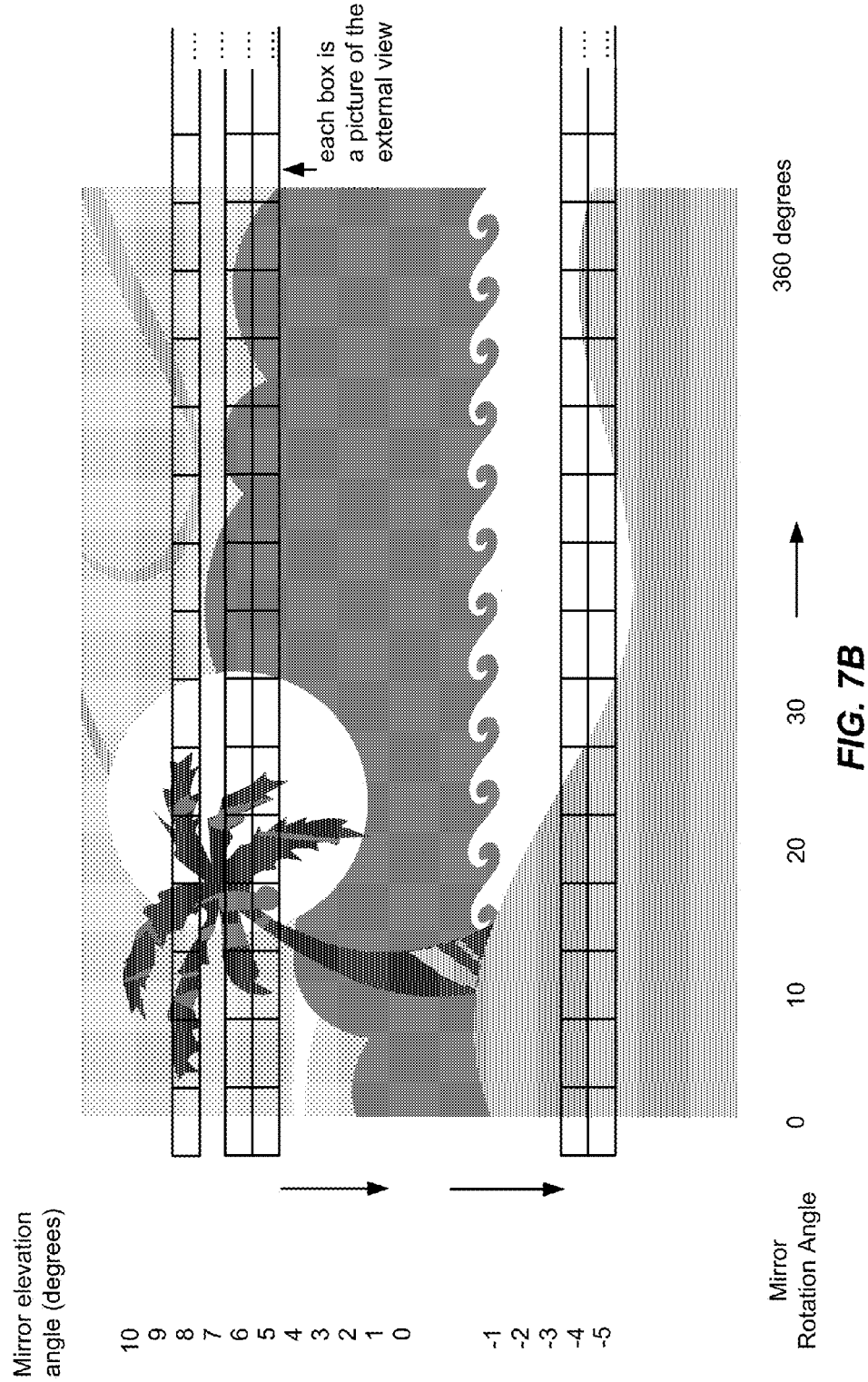
FIG. 7B is a simplified diagram illustrating operation of the angle measurement system illustrated in FIG. 7A.

FIG. 7B is a simplified diagram illustrating operation of the angle measurement system illustrated in FIG. 7A. The rotation of the mirror about mirror axis 720 is shown on the horizontal (X) axis and the tilting of the mirror about the mirror axis 730 is shown on the vertical (Y) axis. At each mirror tilt angle, a panoramic image is formed using the image strips associated with the predetermined range of elevation angles, which is about a one degree range in the embodiment illustrated in FIG. 7B. The panoramic images formed during mirror rotation about mirror axis 720 over these smaller elevation angle ranges are combined as the tilt angle is varied, providing for panoramic images over an extended range of elevation angles.

Although a rotating/tilting mirror has been illustrated in FIG. 7A, other embodiments utilize micromirror arrays in place of the illustrated mirror. For example, utilizing a micromirror array, the tilting of the mirror is replaced with tilting of the individual micromirrors of the micromirror array in an analog manner. As described more fully in U.S. Pat. No. 7,354,167, which is hereby incorporated by reference in its entirety, arrays of micromirrors may be used to perform beam focusing and scanning via actuation of individual micromirrors present in the array. One of skill in the art will appreciate how such micromirror control systems can be integrated with embodiments of the present invention to replace some or all of the tilting functionality described above.

Figure 7C:
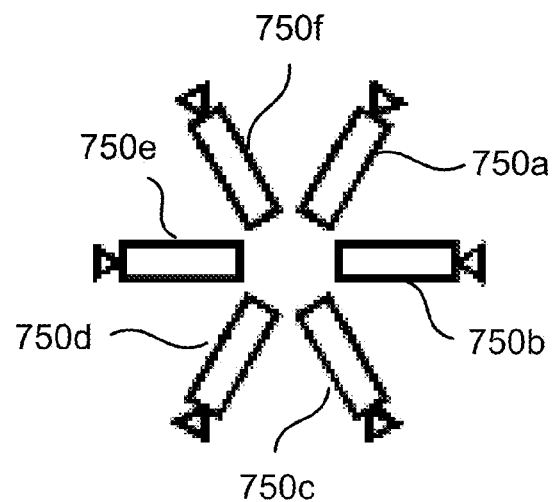
FIG. 7C is a simplified diagram of components of an angle measurement system according to an alternative embodiment of the present invention.

FIG. 7C is a simplified diagram of components of an angle measurement system according to an alternative embodiment of the present invention. A plurality of image sensors 750*a*, 750*b*, 750*c*, 750*d*, 750*e*, and 750*f* are positioned to image consecutive portions of the surroundings, providing a series of images corresponding to the surroundings. Optics associated with the image sensors are not illustrated for purposes of clarity. Concurrent or simultaneous image capture using the multiple image sensors illustrated in FIG. 7C provides for collection of a 360° panoramic image. In order to acquire additional panoramic images at other elevation angles, the optics and/or image sensors can be tilted in and out of the plane of the figure as will be evident to one of ordinary skill in the art.

Although six cameras 750*a*-750*f* are illustrated in FIG. 7C, this particular number of image sensors is not required by the present invention. Other embodiments utilize fewer or additional image sensors as appropriate to the particular application. Image stitching may be performed for systems in which the edges of the adjacent images overlap. One of ordinary skill in the art would recognize many variations, modifications, and alternatives.

Figure 7D:
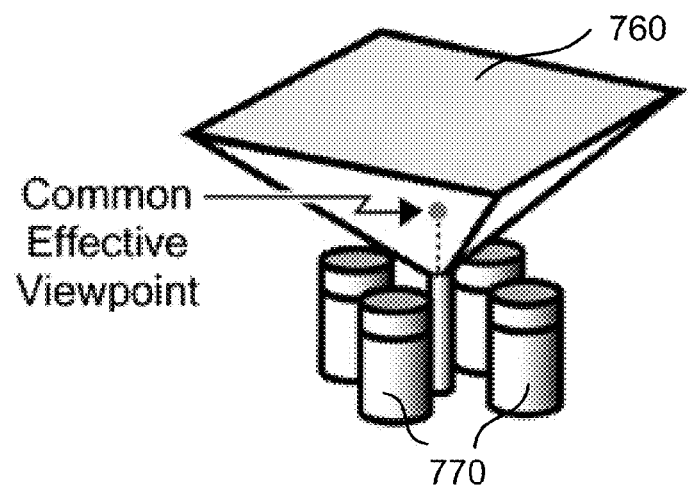
FIG. 7D is a simplified diagram of components of an angle measurement system according to yet another alternative embodiment of the present invention.

FIG. 7D is a simplified diagram of components of an angle measurement system according to yet another alternative embodiment of the present invention. A mirrored pyramid 760 is positioned in relation to multiple (e.g., four) image sensors 770 to reflect light from the surroundings to the multiple image sensors. Optics associated with the image sensors 770 are not illustrated for purposes of clarity. As illustrated in FIG. 7D, the image sensors receive image data associated with one of four different directions, providing a 360° panoramic image of the surroundings. All image sensors are characterized by a common effective viewpoint as shown in the figure.

The mirrored pyramid 760 illustrated in FIG. 7D is characterized by planar surfaces although this is not required by the present invention. The particular shape of the reflective surfaces may be tailored to provide for desired image properties. Additionally, in order to image different elevation angles, the image sensors or the mirrored pyramid may be tilted to provide for imaging of various elevation angles.

Figure 8:
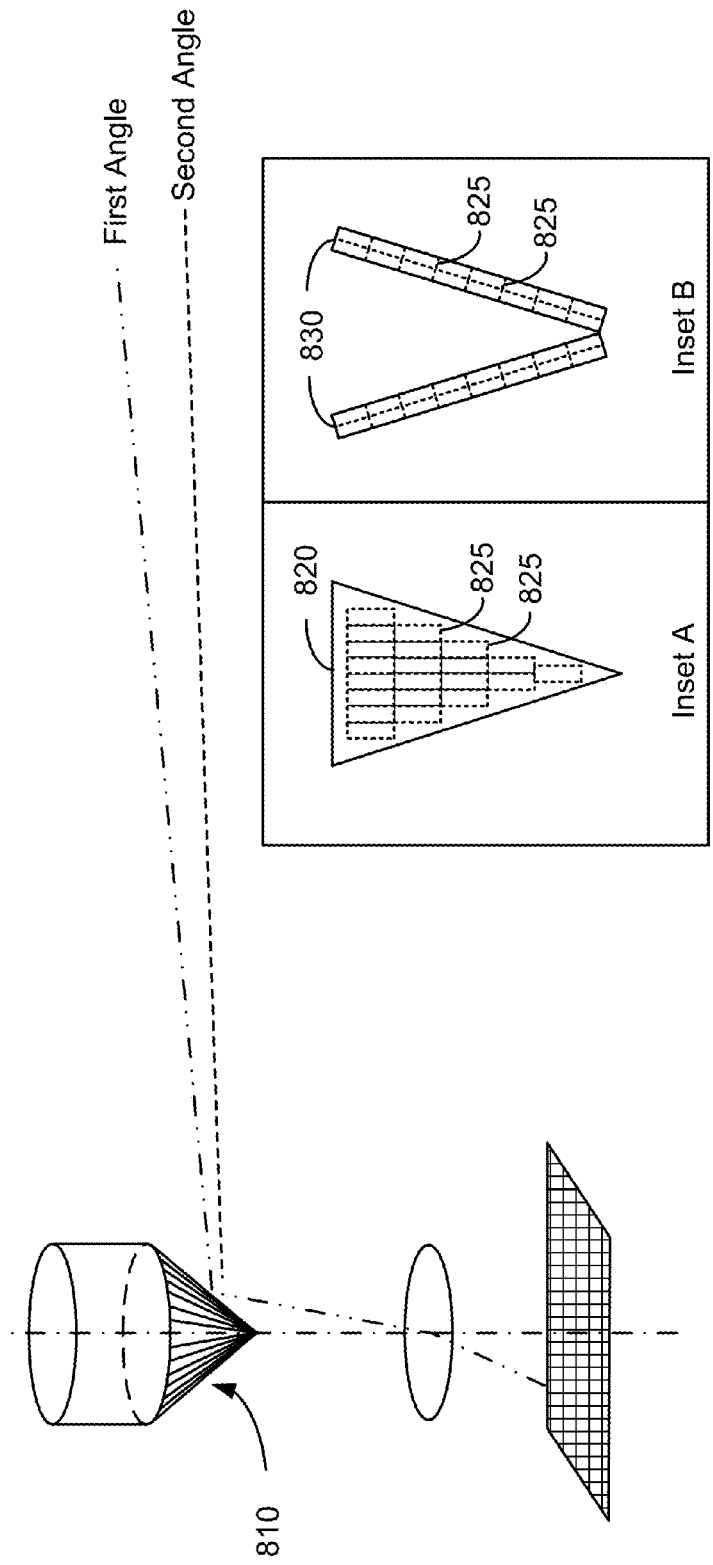
FIG. 8 is a simplified schematic diagram of an angle measurement device according to an alternative embodiment of the present invention.

FIG. 8 is a simplified schematic diagram of an angle measurement device according to an alternative embodiment of the present invention. The angle measurement device illustrated in FIG. 8 shares common components with the device illustrated in FIG. 7A and description similar to that provided in relation to FIG. 7A may be applicable to FIG. 8. Light from an object is received at a first angle as illustrated. The reflective surface 810 may be formed in one of several configurations. As illustrated in inset A, the reflective surface 810 may include a number of mirrored surfaces having a triangular shape 820. The mirrored surfaces may be formed to include a number of micromirrors 825 arrayed on the surface (illustrated with dashed lines to illustrate their ability to tilt) to provide for collection of light from a variety of elevation angles. Referring to FIG. 8, the collection of light from two different elevation angles is illustrated as light from both the first angle and the second angle are imaged at the same portion of the imaging device as a result of tilting of the micromirrors 825. Typically, the imaging of the differing elevation angles is performed sequentially as described above.

An alternative to the reflective surface illustrated in inset A is the reflective surface illustrated in inset B, which includes a plurality of rectangular mirrored surfaces 830 that make up the reflective surface 810. As in inset A, an array of micromirrors 835 (illustrated with dashed lines to illustrate their ability to tilt) can make up the reflective rectangular surface. In order to provide image information associated with the gaps between adjacent rectangular surfaces, rotation of the reflective surface 810 about the mirror axis 820 can be used to fill in this image information. In some embodiments utilizing the mirrors illustrated in inset B, a particular object point may be imaged multiple times as the reflective surface is rotated (e.g., the lower portions of the reflective rectangles are closer than the upper portions). In these embodiments, a processor coupled to the imaging device can be utilized to average out, remove, or otherwise compensate for duplicative image results.

Figure 9A:
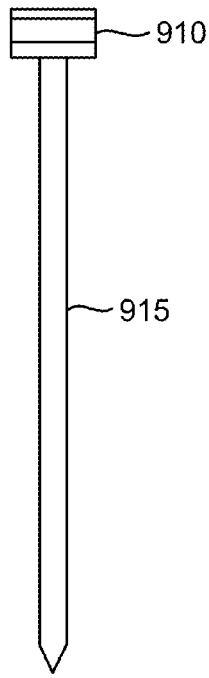
FIGS. 9A-9D are simplified schematic diagrams of various surveying products incorporating an angle measurement device according to an embodiment of the present invention.

FIGS. 9A-9D are simplified schematic diagrams of various surveying products incorporating an angle measurement device according to an embodiment of the present invention. FIG. 9A illustrates a surveying product providing angle measurement functionality. The angle measurement device 910 is mounted on a surveying pole 915. In the embodiment illustrated in FIG. 9A, an inexpensive tool can be provided to surveyors that provides angle measurements. Other components can be added to the pole such as a leveling device or the like without departing from the scope of the present invention.

Figure 9B:
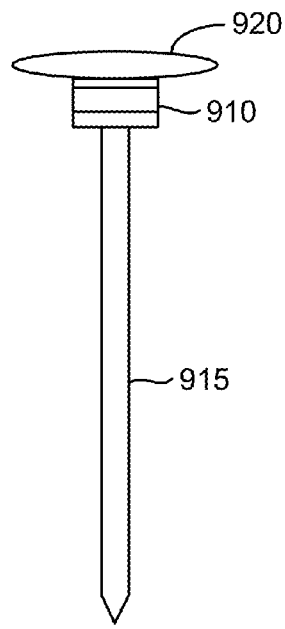

FIG. 9B illustrates a surveying product providing angle measurement and GPS location functionality. The surveying device includes the angle measurement device 910 mounted on the surveying pole 915 as well as a GPS unit 920 mounted on the angle measurement device. The GPS unit 920 is in communication with the angle measurement device so that location information can be utilized by the angle measurement device. Memory (not shown) to store the location and angle information is provided in some embodiments. In alternative embodiments, an EDM unit, a tilt sensor, an azimuth sensor, or other components are provided as part of the surveying product.

Figure 9C:
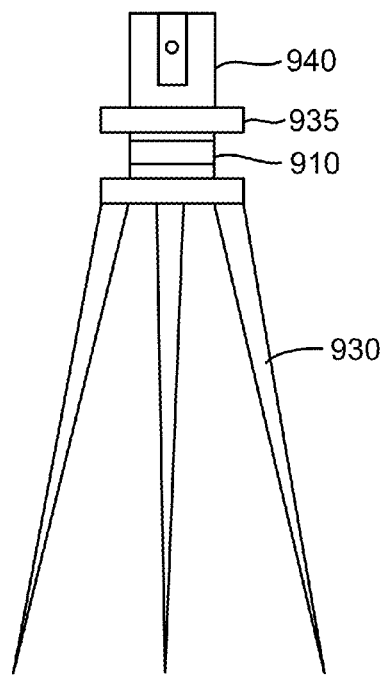

FIG. 9C illustrates a surveying product providing angle measurement, GPS, and distance measuring functionality. The addition of GPS capabilities provides a unit for determining the location of the surveying product with high accuracy. The surveying product includes a tripod 930 with the angle measurement device 910 mounted on the tripod. A mounting bracket 935 is mounted on the angle measurement device to provide for rotation of the distance measuring unit 940. In a particular embodiment, the distance measuring unit 940 is a Total Station surveying instrument available from the present assignee. The Total Station includes a telescope and electronic distance measuring system. Additional description related to the telescope and electronic distance measuring system are provided in International Publication No. WO 2004/027349 A1 and U.S. Patent Application Publication No. 2007/0180716 A1, which are commonly assigned and hereby incorporated by reference in their entirety for all purposes.

The Total Station is able to rotate about at least a horizontal and a vertical rotation axis. The integration of the angle measurement device 910 with the distance measurement device 940 provides information on the angle of rotation of the Total Station during operation. Such information is useful in performing triangulation operations. An exemplary application is surveying, where the angle measurement devices provide real time data to the distance measuring unit during a survey.

Figure 9D:
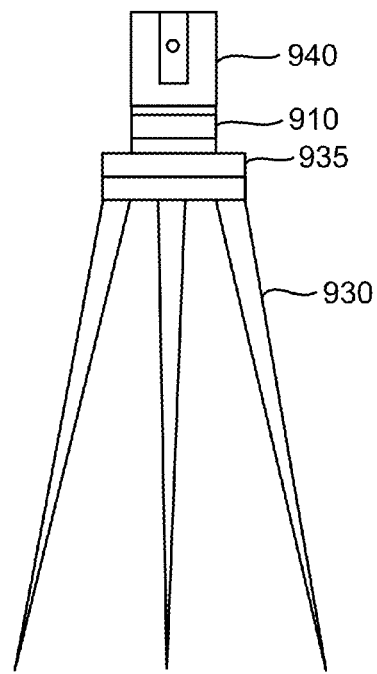

FIG. 9D illustrates another surveying product providing angle measurement, GPS, and distance measuring functionality. The position of the mounting bracket 935 and the angle measurement device 910 are modified from that illustrated in FIG. 9C. Although these four particular implementations have been illustrated, other combinations are included within the scope of the present invention. For example, a GPS location unit could be integrated with either of the implementations illustrated in FIG. 9C or 9D. One of ordinary skill in the art would recognize many variations, modifications, and alternatives.

In another embodiment of the surveying product illustrated in FIG. 9D, the angle measurement system is disposed inside the distance measuring instrument (e.g., the Total Station) shown in FIG. 9D. The camera can be placed in the vertical axis and images can be captured from the outer shell (Alidade). The alidade is rotatable with reference to the vertical axis. For image processing, the structure at the alidade will be used. Some additional light sources inside the housing may be used to simulate significant objects. In addition to imaging up in the vertical direction, imaging downwards is also possible with this embodiment.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of determining an orientation of a measurement device, the method comprising:
   orienting the measurement device at a first position;
   acquiring a first panoramic image from the first position using an imaging device, the first panoramic image including a plurality of object points;
   determining three-dimensional coordinates of the measurement device at the first position using a location measurement device;
   repositioning the measurement device to a second position different from the first position;
   acquiring a second panoramic image from the second position using the imaging device, the second panoramic image including the plurality of object points;
   determining three-dimensional coordinates of the measurement device at the second position using the location measurement device;
   identifying the plurality of object points in the first panoramic image and in the second panoramic image using a processor; and
   determining the orientation of the measurement device at the second position using the processor, the orientation determined based on the three-dimensional coordinates of the measurement device at the first position and the three-dimensional coordinates of the measurement device at the second position.

2. The method of claim 1 wherein the first panoramic image and the second panoramic image comprise 360° panoramic images.

3. The method of claim 1 wherein acquiring the first panoramic image including the plurality of object points and determining the three-dimensional coordinates of the measurement device at the first position are performed concurrently.

4. The method of claim 1 wherein acquiring the first panoramic image including the plurality of object points and determining the three-dimensional coordinates of the measurement device at the first position are performed simultaneously.

5. The method of claim 1 wherein acquiring the second panoramic image including the plurality of object points and determining the three-dimensional coordinates of the measurement device at the second position are performed concurrently.

6. The method of claim 1 wherein acquiring the second panoramic image including the plurality of object points and determining the three-dimensional coordinates of the measurement device at the second position are performed simultaneously.

7. The method of claim 1 wherein identifying the plurality of object points comprises a photogrammetry process.

8. The method of claim 1 further comprising estimating an azimuth associated with the measurement device oriented at the first position.

9. The method of claim 1 wherein the location measurement device comprises a global positioning system (GPS) unit.

10. The method of claim 1 wherein the plurality of object points are identified in the first panoramic image and in the second panoramic image using an image correlation process running on the processor.

11. The method of claim 1 further comprising determining bearing angles of the plurality of object points in the first panoramic image and in the second panoramic image.

12. A method of determining an orientation of a measurement device, the method comprising:
orienting the measurement device at a first position;
acquiring a first 360° panoramic image from the first position using an imaging device, the first 360° panoramic image including a plurality of object points;
estimating an azimuth associated with the measurement device at the first position;
determining three-dimensional coordinates of the measurement device at the first position using a location measurement device;
repositioning the measurement device to a second position different from the first position;
acquiring a second 360° panoramic image from the second position using the measurement device, the second 360° panoramic image including the plurality of object points;
determining three-dimensional coordinates of the measurement device at the second position using the measurement device;
identifying the plurality of object points in the first 360° panoramic image and in the second 360° panoramic image using a processor; and
determining the orientation of the measurement device at the second position using the processor, the orientation determined based on the three-dimensional coordinates of the measurement device at the first position and the three-dimensional coordinates of the measurement device at the second position.

13. The method of claim 12 wherein acquiring the first 360° panoramic image including the plurality of object points and determining the three-dimensional coordinates of the measurement device at the first position are performed concurrently.

14. The method of claim 12 wherein acquiring the first 360° panoramic image including the plurality of object points and determining the three-dimensional coordinates of the measurement device at the first position are performed simultaneously.

15. The method of claim 12 wherein acquiring the second 360° panoramic image including the plurality of object points and determining the three-dimensional coordinates of the measurement device at the second position are performed concurrently.

16. The method of claim 12 wherein acquiring the second 360° panoramic image including the plurality of object points and determining the three-dimensional coordinates of the measurement device at the second position are performed simultaneously.

17. The method of claim 12 wherein identifying the plurality of object points comprises a photogrammetry process.

18. The method of claim 12 wherein the location measurement device comprises a global positioning system (GPS) unit.

19. The method of claim 12 wherein the plurality of object points are identified in the first panoramic image and in the second panoramic image using an image correlation process running on the processor.

20. The method of claim 12 further comprising determining bearing angles of the plurality of object points in the first panoramic image and in the second panoramic image.

* * * * *